United States Patent [19]

Peschka et al.

[11] Patent Number: 4,570,578
[45] Date of Patent: Feb. 18, 1986

[54] METHOD AND DEVICE FOR OPERATING A HYDROGEN MOTOR

[75] Inventors: Walter Peschka, Sindelfingen; Gottfried Schneider; Willi Nieratschker, both of Stuttgart, all of Fed. Rep. of Germany

[73] Assignee: Deutsche Forschungs- und Versuchsanstalt für Luft- und Raumfahrt e.V., Bonn, Fed. Rep. of Germany

[21] Appl. No.: 673,997

[22] Filed: Nov. 21, 1984

[30] Foreign Application Priority Data

Nov. 25, 1983 [DE] Fed. Rep. of Germany ....... 3342582

[51] Int. Cl.<sup>4</sup> ............................................. F02B 75/12
[52] U.S. Cl. ........................... 123/1 A; 123/DIG. 12; 123/27 GE; 62/51
[58] Field of Search ......... 123/1 A, DIG. 12, 27 GE; 62/7, 51, 514 R; 417/366, 368, 32

[56] References Cited

U.S. PATENT DOCUMENTS

| 2,518,597 | 8/1950 | Brooks | 417/32 |
| 3,565,201 | 2/1971 | Petsinger | 62/7 |
| 4,080,800 | 3/1978 | Spaulding et al. | 62/51 |
| 4,276,749 | 7/1981 | Crowley | 62/51 |
| 4,406,129 | 9/1983 | Mills | 62/7 |

FOREIGN PATENT DOCUMENTS

| 2443815 | 4/1976 | Fed. Rep. of Germany. |
| 2717761 | 11/1977 | Fed. Rep. of Germany. |
| 2133480 | 7/1984 | United Kingdom ................. 417/32 |

Primary Examiner—E. Rollins Cross
Attorney, Agent, or Firm—Kenway & Jenney

[57] ABSTRACT

A method and apparatus is provided for propelling a hydrogen engine with cryogenically stored hydrogen, wherein a pump, cooled down to an operating temperature close to the hydrogen boiling point, feeds hydrogen to the fuel-injection hydrogen engine. In order to improve the method and the apparatus so that the pump need not be maintained constantly at the operating temperature, it is proposed that the pump, when its temperature exceeds its operating temperature level, be purged with cold hydrogen gas and thus cooled down until its temperature drops to the operating level, and that the hydrogen gas that has been passed through the pump be utilized to propel the hydrogen engine in a partial-load range.

9 Claims, 1 Drawing Figure

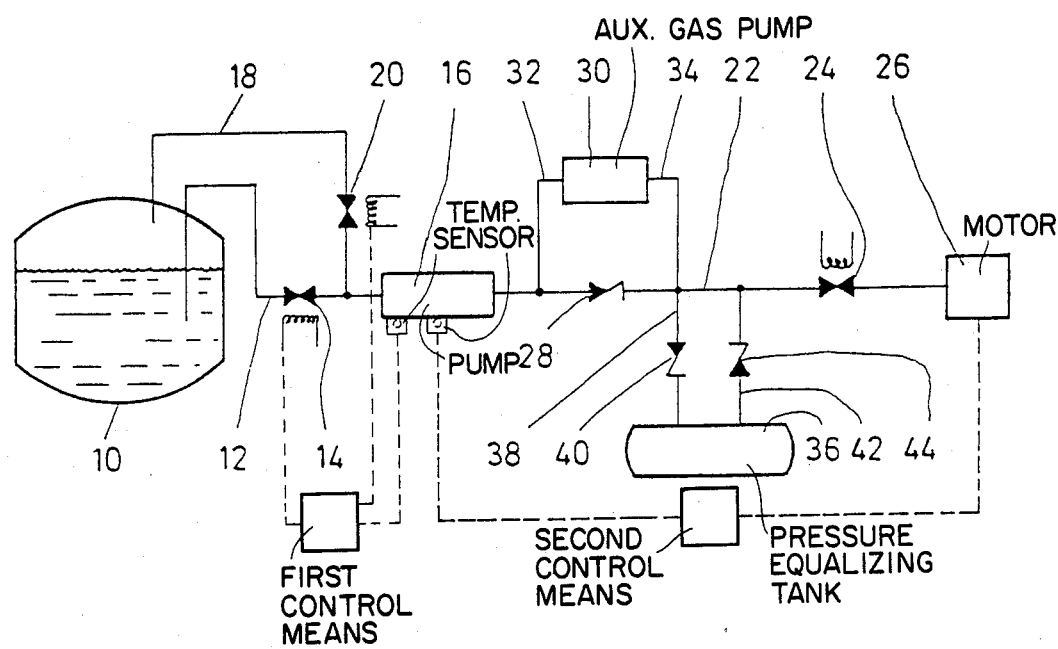

METHOD AND DEVICE FOR OPERATING A HYDROGEN MOTOR

This invention relates to a method for operating a hydrogen motor with cryogenically stored hydrogen, whereby hydrogen is fed to the hydrogen motor, driven by fuel injection, by means of a pump which is cooled to operating temperature which is in the range of the boiling point of hydrogen.

Furthermore, the invention relates to a device for carrying out the method with a cryotank for liquid hydrogen and a pump, having an inlet and an outlet opening, whose inlet opening is connected with the liquid hydrogen in the cryotank and whose outlet opening is provided with a feed pipe leading to a hydrogen motor.

With hydrogen motors, mixture formation can take place in various ways. The simplest possibility is carburetion whereby, as with a conventional carburetor engine, a mixture of air and fuel, that is, in this case, air and hydrogen, is drawn in, compressed and subsequently burned. To accomplish this, hydrogen must be fed to the motor at a pressure of approximately 1 to 2 bar. Another possibility is low-pressure fuel injection, whereby the motor draws in air and whereby, at the start of a compression phase in the vicinity of a bottom dead center, hydrogen is injected. This requires injection pressure in the range of approximately 5 to 10 bar. Compared to the above-noted methods, a greater motor output is attained with high-pressure fuel injection. In this case, hydrogen is only injected toward the end of a compression cycle, that is, in the area of the top dead center. With this injection, which is similar to a diesel operation, injection pressures in the range of 30 to 100 bar and more are required.

To drive a hydrogen motor with fuel injection, a method and a device are known with which liquid hydrogen stored in the cryotank is conveyed by means of a pump which has been cooled to a temperature in the range of the liquid hydrogen, in this case, a liquid hydrogen high-pressure pump, so that the hydrogen, which is under high pressure, can be fed to the hydrogen motor for fuel injection.

The disadvantage of the known method is in that the pump, even when the hydrogen motor is shut off, is constantly maintained at operating temperature, i.e. at temperatures in the range of the boiling point of liquid hydrogen.

With the device for carrying out the known method, the pump is located directly in the cryotank for liquid hydrogen, so that it is constantly at operating temperature. The result of this is that, due to the required large openings in the cryotank for inserting the pump, installing of heat insulation of the cryotank becomes more difficult and that, due to the required feed lines for driving and controlling the pump, additional thermal bridges, which lead into the liquid hydrogen, result. This results in a relatively high evaporation rate of the cryotank.

Moreover, when the pump is built into the cryotank, adjustments during operation are considerably more difficult and servicing is only possible after the pump has been removed from the cryotank.

It is the object of the invention to improve the generic type method in such a way that the pump does not have to be constantly maintained at operating temperature, so that the motor can also be driven with a warm pump and the pump cooled thereby to operating temperature.

This object is solved in accordance with the invention with a method of the above described type in such a way that the pump, at a higher temperature than its operating temperature, is passed through (purged) by cold hydrogen gas and thereby cooled until its operating temperature is attained, and that the hydrogen motor is driven with the hydrogen gas, which has passed through the pump, in a partial-load range.

The advantage of this method is in that the motor can also be driven or started when the pump is warm and, at the same time, the pump can be cooled to operating temperature, so that it is no longer necessary to maintain the pump at operating temperature even when the hydrogen motor is shut off.

With one embodiment of the invention, it is advantageous when the hydrogen gas is pumped through the pump to the hydrogen motor by means of an auxiliary gas pump. The auxiliary gas pump makes it possible to easily pump hydrogen to the hydrogen motor, driven in the partial-load range, and to compress it to the required pressure.

Moreover, it can be advantageous with an embodiment of the method, if, in the event the pump is at a temperature above its operating temperature, the hydrogen motor is driven with advanced injection and that, when the operating temperature of the pump is attained, the hydrogen motor is switched to fuel injection. With this method, the hydrogen gas for driving the motor does not have to be compressed to the high pressures necessary for fuel injection while the pump is being cooled. This considerably facilitates the pumping of the hydrogen. Thus, for example, when using an auxiliary gas pump, it no longer has to be a high-pressure pump, instead, a considerably simpler and less expensive model is sufficient which can produce the necessary low pressure.

It is, moreover, possible to use the liquid hydrogen high-pressure pump, which is at a temperature above its operating temperature, to produce the required pressure, which, indeed, cannot compress hydrogen to high pressure due to sealing problems, however, is able to produce the pressure required for advanced injection.

With a further embodiment of the method, it is advantageous that, in the event the pump is at a temperature above its operating temperature, the hydrogen motor is driven with carburetion and that, when the operating temperature of the pump is attained, the hydrogen motor is switched to fuel injection. Driving the hydrogen motor with carburetion during the cooling phase of the pump enables the use of the liquid hydrogen high-pressure pump functioning above operating temperature, a very simple and inexpensive auxiliary gas pump or no pump at all to produce the necessary low hydrogen pressure, whereby, in the latter instance, the required pressure is produced by the liquid hydrogen evaporating in the cryotank.

Further, it is the object of the invention to create a device for carrying out the method.

This object is solved according to the invention with a device of the above described type in that the pump is located outside of the cryotank and that an intake pipe, extending from the inlet opening, separates into a first intake pipe for liquid hydrogen and into a second intake pipe, provided with a valve means, for hydrogen gas, which both lead into the cryotank.

The advantage of this device lies in that, when a pump is positioned outside the cryotank, the evaporation rate of the tank is substantially lower due to a better insulation of the tank and a smaller number of thermal bridges leading into the tank. In addition, with this arrangement, the liquid hydrogen high-pressure pump is substantially more easily accessible for adjustments and servicing.

With a preferred embodiment, it is provided that the first intake pipe has a valve means. This offers the advantage that it is ensured, when the hydrogen gas is drawn in for cooling the pump, that no liquid hydrogen is drawn in.

With a further embodiment, it is advantgeous when a first control means is provided which, in the event the pump is at a temperature above its operating temperature, closes the valve in the first intake pipe and opens the valve in the second intake pipe, and which, in the case when the pump is at operating temperature, opens the valve in the first intake pipe and closes the valve in the second intake pipe. This control means guarantees that either only gaseous or only liquid hydrogen is drawn in from the cryotank.

It is furthermore advantageous that a second control means be provided which, in the case when the pump is at a temperature above its operating temperature, switches the hydrogen motor to advanced injection or carburetion and, when the operating temperature is attained, switches to fuel injection.

With a further embodiment, it is provided that a one-way circuit with a check valve, pervious only in direction of the hydrogen motor, and, parallel thereto, an auxiliary gas pump are arranged in the feed pipe. The advantage of the auxiliary gas pump lies in that, in the event the pump is at a temperature above its operating temperature, the pressure of the hydrogen gas required for operating the hydrogen motor can be easily produced with it. Moreover, the one-way circuit has the advantage that, when the working pump is at operating temperature, the hydrogen does not flow through the no longer necessary auxiliary gas pump but, instead, is led through the one-way circuit past the auxiliary gas pump to the hydrogen motor.

Additional features and advantages of the invention become evident from the following description as well as from the attached drawing of an embodiment of the invention. The drawing is a schematic representation of a device according to the invention.

a first intake pipe 12, dipping into the liquid hydrogen and having a valve 14, leads from a cryotank containing liquid hydrogen to an inlet opening of a liquid hydrogen high-pressure pump 16. A second intake pipe 18 for gaseous hydrogen, having a valve 20, dips into a gas bubble of hydrogen, which is located above the liquid hydrogen in the cryotank 10, and discharges between valve 14 of the first intake pipe 12 and the inlet opening of the liquid hydrogen high-pressure pump 16 into the first intake pipe 12.

A feed pipe 22, extending from an outlet opening of the liquid hydrogen high-pressure pump 6 and having a valve 24, leads to a hydrogen motor 26.

Between the outlet opening of the liquid hydrogen high-pressure pump 16 and valve 24, a check valve 28, which is pervious only in direction of the hydrogen motor 26, and, parallel to this check valve, an auxiliary gas pump 30, having a suction pipe 32 and a pressure pipe 34 are arranged in the feed pipe 22, whereby the suction pipe 32 branches off from the feed pipe 22 between the liquid hydrogen high-pressure pump 16 and the check valve 28 and the pressure pipe 34 discharges into the feed pipe 22 between the check valve 28 and the valve 24. To balance fluctuations of pressure, a pressure equalizing tank 36 is provided between check valve 28 and valve 24, parallel to the feed pipe 22. This pressure equalizing tank 36 has a feed pipe 38, which branches off from the feed pipe 22 and has a check valve 40, as well as a return pipe 42, which leads to the feed pipe 22 and also has a check valve 44.

Several possibilities are conceivable for starting the liquid hydrogen high-pressure pump 16 and the auxiliary gas pump 30. Thus, for example, a hydraulic drive mechanism, driven by the hydrogen motor 26, is provided for the liquid hydrogen high-pressure pump 16. It is, however, also possible that the liquid hydrogen high-pressure pump 16 and the auxiliary gas pump 30 are electrically driven.

The valve 14 in the first intake pipe 12, valve 20 in the second intake pipe 18, as well as valve 24 in the feed pipe 22 can be operated in various ways. For example, valves 14, 20, 24 can be electromagnetically operable, i.e. these are then solenoid valves.

If the liquid hydrogen high-pressure pump 16 is at a temperature above operating temperature, then valve 14 in the first intake pipe 12 is closed and valve 20 in the second intake pipe 18 is opened. By switching the auxiliary gas pump 30 on, hydrogen gas is now drawn in from the gas bubble located above the liquid hydrogen in the cryotank 10. It flows through the second intake pipe 18, the opened valve 20, the liquid hydrogen high-pressure pump 16, feed pipe 22 and suction pipe 32 to the auxiliary gas pump 30 and thereby cools the liquid hydrogen high-pressure pump 16.

The auxiliary gas pump 30 produces the necessary pressure for the mixture formation which is used in each case in the hydrogen motor 26, i.e. with fuel injection, a pressure of 30 to 100 bar and more, with advanced injection, a pressure of 5 to 10 bar and with carburetion a pressure of 1 to 2 bar. After opening the valve 24 in feed pipe 22, the compressed hydrogen gas can flow through the pressure line 34 via feed pipe 22 to hydrogen motor 26. Possible fluctuations of pressure are balanced by the pressure equalizing tank 36.

The check valve 28, arranged parallel to the auxiliary gas pump 30 in the feed pipe 22, prevents, with this method of operation, that the auxiliary gas pump 30 is short-circuited and not able to produce the required pressure.

During the cooling process, the liquid hydrogen high-pressure pump 16 can be switched on or off. When the liquid hydrogen high-pressure pump 16 is switched off, it is, however, necessary that valves and plunger are constructed in such a way that the liquid hydrogen high-pressure pump 16 has almost no or only a very slight resistance to flow in conveying direction and can thus be purged and cooled by the cold hydrogen gas drawn in through the auxiliary gas pump 30. It is, however, also conceivable that the liquid hydrogen high-pressure pump 16, although it is at a temperature above its operating temperature, is switched on, however, due to the thermal expansion of plunger and valves, can only produce a slight pressure and functions as forepump for the auxiliary gas pump 30.

As soon as the operating temperature of the liquid hydrogen high-pressure pump 16 is attained, valve 20 in the second intake pipe for gaseous hydrogen is closed, valve 14 of the first intake pipe 12 is opened, the liquid hydrogen high-pressure pump 16 switched on and the auxiliary gas pump 30 switched off. Liquid hydrogen is therewith drawn in by the liquid hydrogen high-pressure pump 16 from the cryotank 10 via the first intake pipe 12 and thus hydrogen under high pressure is produced which flows through the feed pipe 22, through the check valve 28 located in it and valve 24 to the hydrogen motor 26 driven with fuel injection.

When the hydrogen motor 26 is shut off, the valve 24 is simultaneously closed, so that hydrogen, which is still under high pressure, is stored in the pressure equalizing tank 36. This is sufficient in order to, after short stoppages during which the liquid hydrogen high-pressure pump 16 does not warm up, immediately start the hydrogen motor 26 with fuel injection and hydrogen feeding by means of the liquid hydrogen high-pressure pump 16, without the necessity of having to switch the auxiliary gas pump 30 on as well.

In a variation of the embodiment shown in the drawing, the auxiliary gas pump 30 can be omitted if the hydrogen motor 26, in the event that the liquid hydrogen high-pressure pump 16 is at a temperature above its operating temperature, is driven with advanced injection or carburetion. The hydrogen pressures required with these two types of mixture formation can also be produced by the liquid hydrogen high-pressure pump 16, operating out of its optimum performance, so that, after attaining the operating temperature of the liquid hydrogen high-pressure pump 16, only switching the hydrogen motor 26 from advanced injection or carburetion to fuel injection and closing valve 20 in the second intake pipe 18 for gaseous hydrogen, as well as opening valve 14 in the first intake pipe 12 for liquid hydrogen, are required.

If the hydrogen motor 26, in the event the liquid hydrogen high-pressure pump 16 is at a temperature above its operating temperature, is only driven with carburetion, then the pressure in the hydrogen gas phase, resulting in the cryotank 10 by evaporating hydrogen, is sufficient to drive the hydrogen motor 26, without it being necessary to switch the liquid hydrogen high-pressure pump 16 on. In order to accomplish this, it is however necessary to construct the liquid hydrogen high-pressure pump 16 in such a way that the valves and the plunger have only a slight resistance to flow in the switched-off position in conveying direction and permit a flow of gas. After the operating temperature of the liquid hydrogen high-pressure pump 16 is attained, the pump 16 is switched on, valve 20 is closed, valve 14 is opened and the hydrogen motor 26 is switched from carburetion to fuel injection.

We claim:

1. Method for operating a hydrogen motor with cryogenically stored hydrogen comprising conveying hydrogen to the hydrogen motor driven by fuel injection via a pump which is cooled to an operating temperature which is in the range of the boiling point of hydrogen, cooling the pump, at a higher temperature than its operating temperature, by passing cold hydrogen gas through the pump until the operating temperature is attained and driving the hydrogen motor with the hydrogen gas which has passed through the pump, in a partial-load range.

2. Method according to claim 1, characterized in that the hydrogen gas is pumped through the pump to the hydrogen motor by means of an auxiliary gas pump.

3. Method according to claim 1 or 2, characterized in that, in the event that the pump is at a temperature above its operating temperature, the hydrogen motor is driven with advanced injection and that, when the operating temperature of the pump is attained, the hydrogen motor is switched over to fuel injection.

4. Method according to claim 1 or 2, characterized in that, in the event the pump is at a temperature which is above its operating temperature, the hydrogen motor is driven with carburetion and that, when the operating temperature of the pump is attained, the hydrogen motor is switched to fuel injection.

5. Hydrogen motor with cryogenically stored hydrogen conveyed to the motor via a pump which is cooled to an operating temperature which is in the range of the boiling point of hydrogen by passage of cold hydrogen gas, a cryotank for liquid hydrogen and a pump having an inlet and outlet opening, whose inlet opening is connected with the liquid hydrogen in the cryotank and whose outlet opening is provided with a feed pipe leading to a hydrogen motor, characterized in that the pump (16) is positioned outside the cryotank (10) and that an intake pipe, extending from the inlet opening, separates into a first intake pipe (12) for liquid hydrogen and into a second intake pipe (18), provided with a valve means (20), for hydrogen gas, both intake pipes leading into the cryotank (10).

6. Device according to claim 5, characterized in that the first intake pipe (12) has a valve means (14).

7. Device according to claim 5 further comprising temperature sensing means characterized in that a first control means is provided which, in the event the pump (16) is at a temperature which is above its operating temperature, closes the valve (14) in the first intake pipe (12) and opens the valve (20) in the second intake pipe (18), as well as in the case when the pump (16) is at operating temperature, said control means opens the valve (14) in the first intake pipe (12) and closes the valve (20) in the second intake pipe (18).

8. Device according to claim 5 for carrying out the method according to claim 3 or 4, further comprising temperature sensing means characterized in that a second control means is provided which, in the event the pump (16) is at a temperature above its operating temperature, switches the hydrogen motor (26) to advanced injection or carburetion and, when the operating temperature is attained, switches to fuel injection.

9. Device according to claim 5, characterized in that a one-way circuit with a check valve (28), pervious only in direction of the hydrogen motor (26), and, parallel to it, an auxiliary gas pump (30) are arranged in the feed pipe (22).

* * * * *